(12) United States Patent
Jin

(10) Patent No.: US 10,047,686 B2
(45) Date of Patent: Aug. 14, 2018

(54) PHYSICS BASED SINGLE CYLINDER CHARGING MODEL

(71) Applicant: GM Global Technology Operations LLC, Detroit, MI (US)

(72) Inventor: Ning Jin, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 174 days.

(21) Appl. No.: 15/054,498

(22) Filed: Feb. 26, 2016

(65) Prior Publication Data

US 2017/0030273 A1 Feb. 2, 2017

Related U.S. Application Data

(60) Provisional application No. 62/199,611, filed on Jul. 31, 2015.

(51) Int. Cl.
F02D 35/02 (2006.01)
F02D 41/00 (2006.01)
F02D 41/18 (2006.01)

(52) U.S. Cl.
CPC .......... *F02D 35/02* (2013.01); *F02D 35/024* (2013.01); *F02D 35/026* (2013.01); *F02D 41/0002* (2013.01); *F02D 41/0062* (2013.01); *F02D 41/18* (2013.01); *F02D 2200/0406* (2013.01); *Y02T 10/42* (2013.01); *Y02T 10/47* (2013.01)

(58) Field of Classification Search
CPC ...... F02D 35/02; F02D 35/024; F02D 35/026; F02D 41/0002; F02D 41/0062; F02D 41/18; F02D 2200/0406; Y02T 10/42; Y02T 10/47

USPC ......................................................... 701/102
See application file for complete search history.

(56) References Cited

U.S. PATENT DOCUMENTS

| | | | | |
|---|---|---|---|---|
| 6,236,908 B1 * | 5/2001 | Cheng | ................. | F02D 41/0062 701/1 |
| 2002/0189581 A1 * | 12/2002 | Gaessler | ............ | F02D 13/0207 123/295 |
| 2003/0188571 A1 * | 10/2003 | Wright | ................ | F02D 41/1448 73/114.16 |
| 2005/0251317 A1 * | 11/2005 | Tanaka | ...................... | F01L 1/34 701/102 |
| 2010/0185380 A1 * | 7/2010 | Katou | ................. | F02D 13/0211 701/103 |

(Continued)

*Primary Examiner* — Joseph Dallo
*Assistant Examiner* — Yi-Kai Wang

(57) ABSTRACT

A system includes a residual per cylinder calculation module that calculates an amount of residual (i.e., trapped exhaust gas) within an engine cylinder. A temperature calculation module calculates a temperature within the engine cylinder based on the amount of residual. A first air per cylinder (APC) calculation module calculates total charge content within the engine cylinder based on the temperature and calculates a first amount of air trapped within the engine cylinder based on the total charge content and the amount of residual. A residual mass fraction (RMF) calculation module calculates an RMF of the exhaust gas based on the amount of trapped exhaust gas at EVC and the total charge content. A second APC calculation module determines a backflow of the charged content into the engine cylinder and calculates a second amount of air trapped within the engine cylinder based on the backflow and the first amount of air.

14 Claims, 4 Drawing Sheets

(56) References Cited

U.S. PATENT DOCUMENTS

| | | | |
|---|---|---|---|
| 2012/0296556 A1* | 11/2012 | Burleigh | F02D 41/266 701/105 |
| 2015/0308321 A1* | 10/2015 | Zhang | F01N 9/005 60/286 |
| 2016/0169142 A1* | 6/2016 | Klingbeil | F02D 19/061 123/435 |
| 2017/0009688 A1* | 1/2017 | Okunishi | F02D 41/1486 |

* cited by examiner

PHYSICS BASED SINGLE CYLINDER CHARGING MODEL

CROSS-REFERENCE TO RELATED APPLICATIONS

This application claims the benefit of U.S. Provisional Application No. 62/199,611, filed on Jul. 31, 2015. The disclosure of the above application is incorporated herein by reference in its entirety.

FIELD

The present disclosure relates to systems and methods for estimating operating parameters of internal combustion engines.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. In some types of engines, air flow into the engine may be regulated via a throttle. The throttle may adjust a throttle opening area, which increases or decreases air flow into the engine. As the throttle opening area increases, the air flow into the engine increases. A fuel control system adjusts the amount that fuel is injected to provide a desired air/fuel mixture to the cylinders and/or to achieve a desired torque output. Increasing the amount of air and fuel provided to the cylinders increases the torque output of the engine.

Operation of the engine may be controlled according to various parameters and characteristics. For example, the engine may be controlled to maximize volumetric efficiency, which indicates a ratio of the amount of air inducted into the cylinder by a piston to the total amount of air that can be inducted under static conditions. Various characteristics may be measured, estimated, and/or modelled to determine the volumetric efficiency of the engine.

SUMMARY

A system includes a residual per cylinder calculation module that calculates an amount of residual within an engine cylinder. The residual corresponds to exhaust gas trapped within the engine cylinder (i.e., trapped exhaust gas). An in-cylinder temperature calculation module calculates a temperature within the engine cylinder based on the calculated amount of trapped exhaust gas and the assumption of homogenous mixing of residual and inducted air at a predetermined crank angle with no pressure gradient across the intake valves (e.g. bottom dead center). A first air per cylinder (APC) calculation module calculates a total charge content within the engine cylinder at the predetermined crank angle based on the calculated temperature and calculates a first amount of air trapped within the engine cylinder based on the total charge content and the calculated amount of residual gas. A residual mass fraction (RMF) calculation module calculates an RMF of the exhaust gas trapped within the engine cylinder based on the amount of trapped exhaust gas at EVC and the total charge content. A second APC calculation module determines a backflow of the charged content into the intake runner if intake valves have not fully closed after bottom dead center (BDC) and calculates a second (final) amount of air trapped within the engine cylinder based on the backflow and the first amount of air. An engine control module controls at least one parameter of an engine based on at least one of the RMF and the second (final) amount of air.

A method includes calculating an amount of residual (trapped exhaust gas) within an engine cylinder, calculating a temperature within the engine cylinder based on the calculated amount of residual and the assumption of homogenous mixing of residual and inducted air at a predetermined crank angle with no pressure gradient across the intake valves (e.g. bottom dead center), calculating a total charge content within the engine cylinder at the predetermined crank angle based on the calculated temperature, calculating a first amount of air trapped within the engine cylinder based on the total charge content and the calculated amount of residual gas, calculating a residual mass fraction (RMF) of the exhaust gas trapped within the engine cylinder based on the amount of trapped exhaust gas at EVC and the total charge content, determining a backflow of the charged content into the intake runner if intake valves haven't fully closed after bottom dead center (BDC), calculating a second amount of air trapped within the engine cylinder based on the backflow and the first amount of air, and controlling at least one parameter of an engine based on at least one of the RMF and the second amount of air.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Various air per cylinder (APC) values may be used to determine a torque, a volumetric efficiency, and/or one or more other control parameters of an engine. For example, APC values may include, but are not limited to, an amount of air entering one or more engine cylinders and/or an amount of air trapped within one or more cylinders at particular stages of a combustion cycle (e.g., at bottom dead center, or BDC). Other parameters indicative of engine combustion performance include, for example only, a residual (trapped exhaust gas) within a cylinder (e.g., residual per cylinder, or RPC) during induction process. RPC may refer to a residual mass of exhaust gas remaining within a cylinder at certain stages (e.g., bottom dead center (BDC) or intake valve closed (IVC)) of the induction process.

APC and RPC are indicative of an amount and percent of oxygen per charge in a cylinder (or in all cylinders of the engine), which is further indicative of potential power output of the engine. Accordingly, effectively controlling the amount and percent of oxygen is desirable for maximizing engine performance and accurately determining APC and RPC improves the control of the amount and percent of oxygen, and the quality of engine combustion.

RPC and/or APC may be determined and/or predicted according to various methods. Systems and methods according to the principles of the present disclosure implement a physics-based single cylinder charging model to determine RPC and APC with improved accuracy. For example, the model provides continuous trapped APC estimation and prediction, as well as RPC estimation and prediction in real-time, resulting in improved fuel economy. For example, conventional systems implement independent/separate RPC and APC models, while the systems and methods of the present disclosure implement a single model to determine both RPC and APC.

Figure 1:
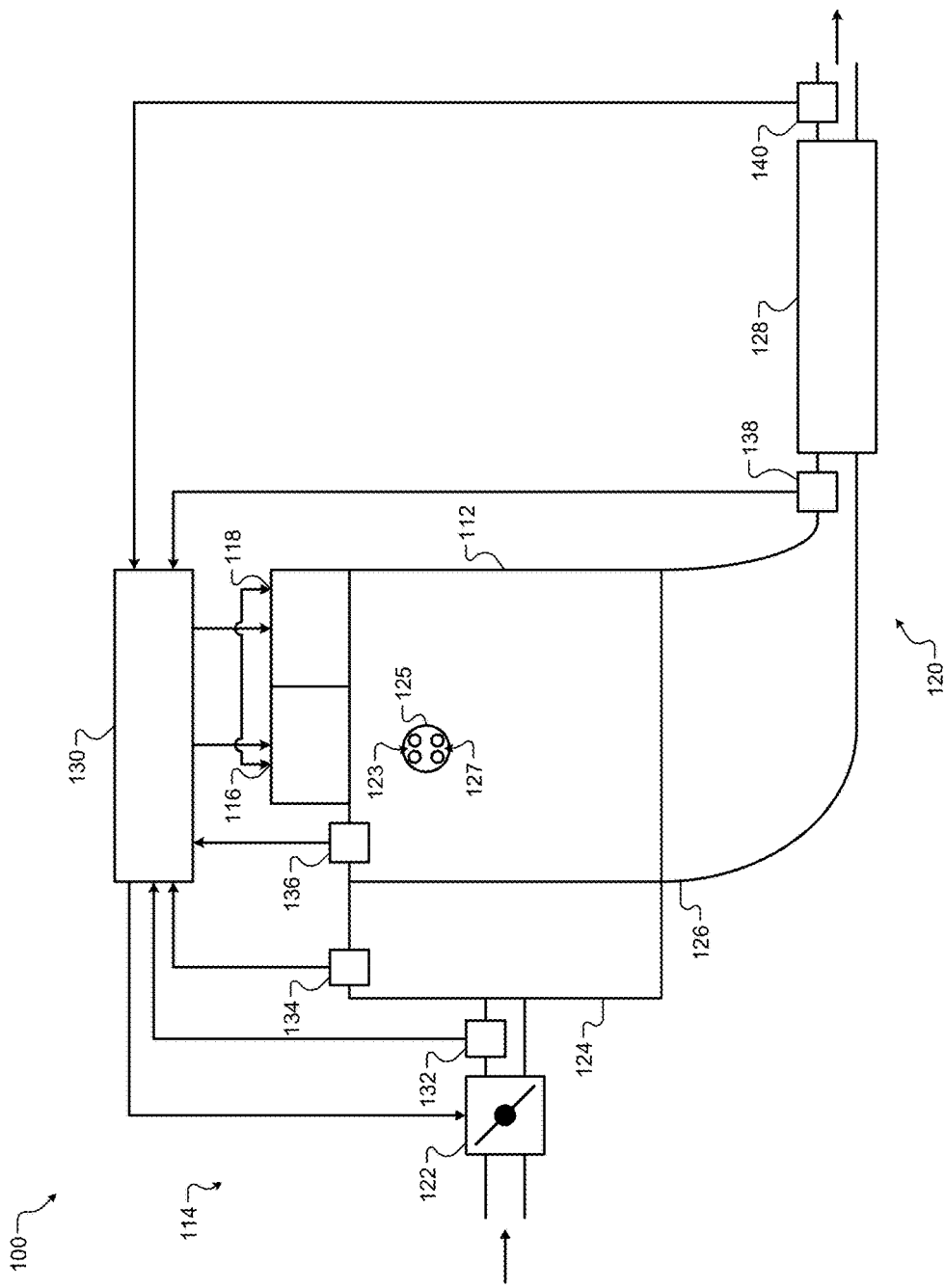
FIG. 1 is an example engine system according to the principles of the present disclosure.

Referring now to FIG. 1, a functional block diagram of an example engine system 100 is presented. The engine system 100 includes an engine 112, an intake system 114, a fuel injection system 116, an ignition system 118, and an exhaust system 120. While the engine system 100 is shown and will be described in terms of a gasoline engine, the present application is applicable to diesel engine systems, hybrid engine systems, and other suitable types of engine systems having a fuel vapor purge system.

The intake system 114 may include a throttle 122, an intake manifold 124, and intake valves 123. The throttle 122 controls air flow into the intake manifold 124. Air flows from the intake manifold 124 into one or more cylinders within the engine 112 through intake valves 123, such as cylinder 125. While only the cylinder 125 is shown, the engine 112 may include more than one cylinder. The fuel injection system 116 includes a plurality of fuel injectors and controls (liquid) fuel injection for the engine 112. Fuel vapor may also be selectively provided to the engine 112 via the intake system 114.

Exhaust resulting from combustion of the air/fuel mixture is expelled from the engine 112 to the exhaust system 120 through exhaust valves 127. The exhaust system 120 includes exhaust valves 127, an exhaust manifold 126, and a catalyst 128. For example only, the catalyst 128 may include a three way catalyst (TWC) and/or another suitable type of catalyst. The catalyst 128 receives the exhaust output by the engine 112 and reacts with various components of the exhaust.

The engine system 100 also includes an engine control module (ECM) 130 that regulates operation of the engine system 100. The ECM 130 communicates with the intake system 114, the fuel injection system 116, and the ignition system 118. The ECM 130 also communicates with various sensors. For example only, the ECM 130 may communicate with a mass air flow (MAF) sensor 132, a manifold air pressure (MAP) sensor 134, a crankshaft position sensor 136, and other suitable sensors.

The MAF sensor 132 measures a mass flowrate of air flowing into the intake manifold 124 and generates a MAF signal based on the mass flowrate. The MAP sensor 134 measures pressure within the intake manifold 124 and generates a MAP signal based on the pressure. In some implementations, vacuum within the intake manifold 124 may be measured relative to ambient pressure.

The crankshaft position sensor 136 monitors rotation of a crankshaft (not shown) of the engine 112 and generates a crankshaft position signal based on the rotation of the crankshaft. The crankshaft position signal may be used to determine an engine speed (e.g., in revolutions per minute). The crankshaft position signal may also be used for cylinder identification and one or more other suitable purposes.

Figure 2:
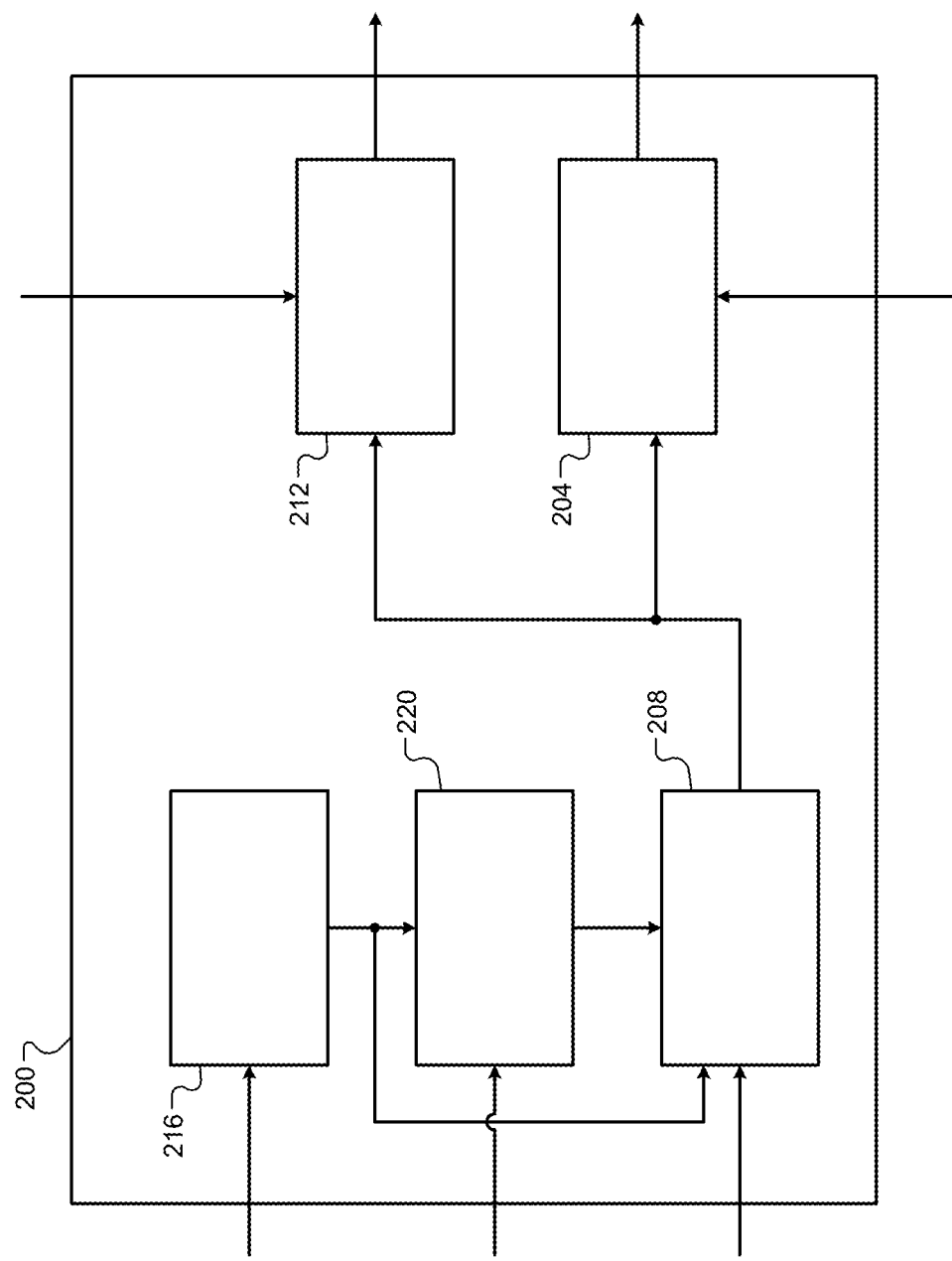
FIG. 2 is an example engine control module that implements an in-cylinder pressure model according to the principles of the present disclosure.

The ECM 130 implements a model to calculate RPC and APC according to the principles of the present disclosure (as described in more detail in FIG. 2). For example only, the calculated APC may correspond to a predicted mass of air that will be trapped within a next cylinder in a cylinder firing order, a mass of air that is actually trapped within a present (activated) cylinder in the firing order, etc. The ECM 130 may then determine volumetric efficiency (VE) or other performance indicators of the engine system 100 using the calculated RPC and/or APC. For example, the VE may be based on parameters including, but not limited to, APC, RPC, a temperature of the air trapped within respective cylinders (i.e., charge temperatures, which may be based on ambient air temperature, engine coolant temperature, etc., or based on a direct measurement using thermocouples), intake port pressure (e.g., based on a pressure within the intake manifold 110), a cylinder volume, and/or the ideal (or universal) gas constant.

Referring now to FIG. 2, an example ECM 200 includes an APC at intake valve closed (IVC) calculation module 204, an APC at BDC calculation module 208, a residual mass fraction (RMF) at BDC calculation module 212, an RPC at exhaust valve closed (EVC) calculation module 216, and an in-cylinder temperature calculation module 220. For example only, the modules 204, 208, 212, 216, and 220 implement the physics-based single cylinder charging model according to the principles of the present disclosure. The RPC at EVC calculation module 216 determines an amount of residual (trapped exhaust gas) in the cylinder at an EVC position. The in-cylinder temperature calculation module 220 determines an in-cylinder temperature (i.e., temperature of the mixture of inducted air and exhaust residual within the cylinder) at BDC. The APC at BDC calculation module 208 determines the APC at BDC (e.g., corresponding to a difference between the total charging content and the trapped exhaust gas). The RMF at BDC calculation module 212 determines a total RMF of exhaust gas trapped in the cylinder at BDC (e.g., corresponding to a ratio of the total trapped RPC of the cylinder to a total charging content (APC+RPC) of the cylinder). The APC at IVC calculation module 208 determines the APC at an IVC position (e.g., determining charging content backflow and determining the APC based on a difference between the APC at BDC and the charging content backflow at IVC).

The RPC at EVC calculation module 216 determines the amount of residual (trapped exhaust gas) in the cylinder at the EVC position by using an in-cylinder pressure model to calculate changes in the trapped exhaust gas. In some implementations, the ECM 200 may include an in-cylinder pressure calculation module to execute the in-cylinder pressure model. For example, the RPC at EVC calculation module 216 determines exhaust port and intake port zero-flow crank angles for the cylinder and determines an overlap range using the exhaust port and intake port zero-flow crank angles. For example, the overlap range corresponds to a range of crank angles where the intake port of the cylinder is opening and the exhaust port is closing. A beginning of the overlap range (e.g., at crank angle θEBS, where EBS indicates an exhaust valve starting point) corresponds to an exhaust backflow starting point (where exhaust starts to flow from exhaust runner/manifold back into the cylinder) and an end of the overlap range (e.g., at crank angle θIFS, where IFS indicates an intake valve starting point) corresponds to an intake forward-flow starting point (where air starts to flow from intake runner/manifold into the cylinder). In one example, these angles can be determined according to $\Sigma_{i=0}{}^n \theta_{EBS}{}^i f_i(p_c)=0$ and $\Sigma_{i=0}{}^n \theta_{IFS}{}^i f_i(p_c)=0$, respectively, where $p_c$ corresponds to an in-cylinder pressure (e.g., as calculated using an in-cylinder pressure model according to the principles of the present disclosure).

Figure 3:
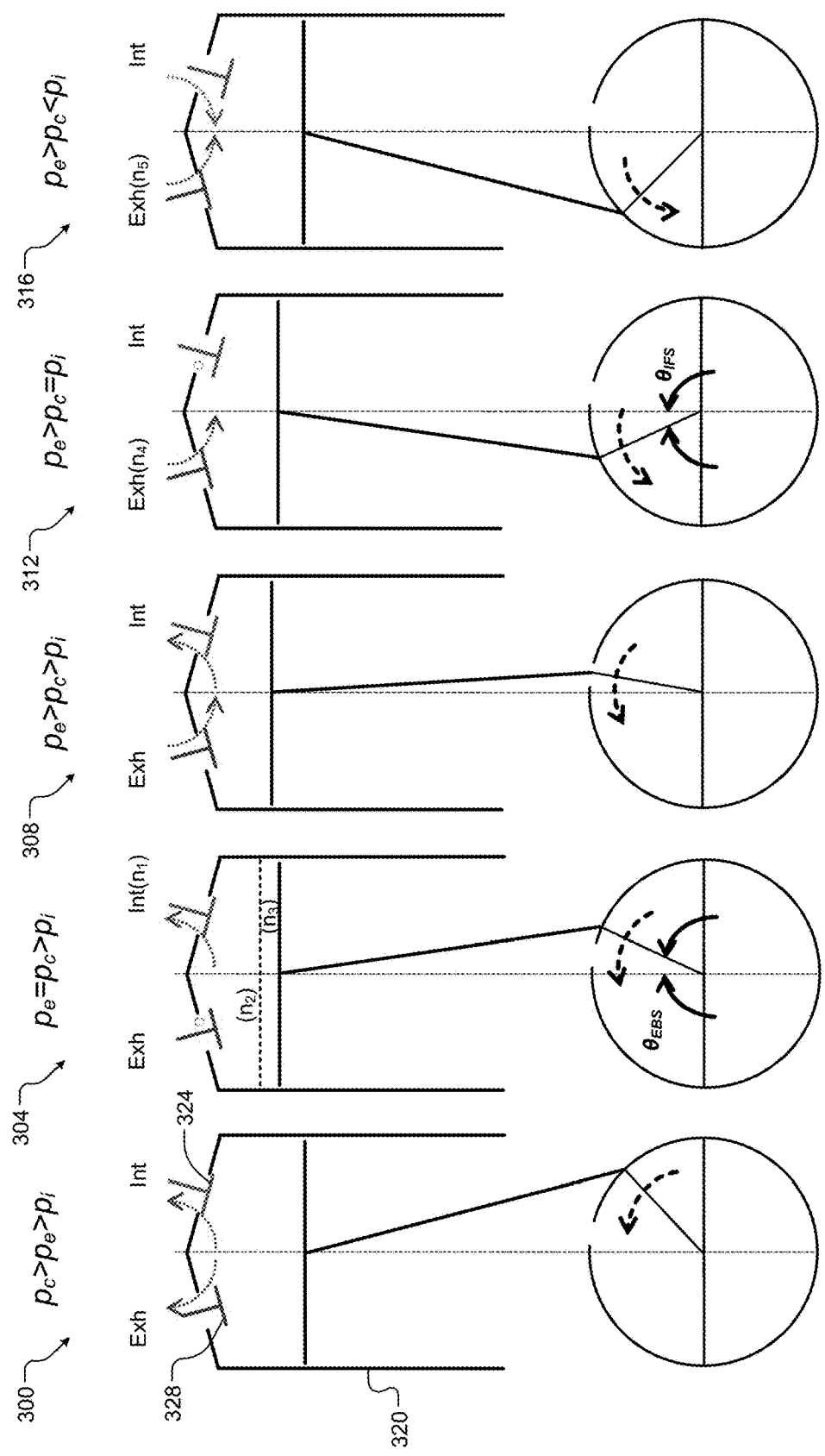
FIG. 3 illustrate example flow patterns in an exhaust backflow process according to the principles of the present disclosure.

FIG. 3 shows example flow patterns 300, 304, 308, 312, and 316 for a cylinder 320. The flow patterns relate $p_e$, $p_c$, and $p_i$ (exhaust port pressure, in-cylinder pressure, and intake port pressure, respectively) as shown. At 300, air flows out of both an intake port 324 and an exhaust port 328. At 304 (corresponding to crank angle θEBS) air flows out of the intake port 324 but the exhaust port 328 is at a zero-flow angle. At 308, air flows into the exhaust port 328 and out of the intake port 324. At 312 (corresponding to crank angle θIFS), air flows into the exhaust port 328 but the intake port 324 is at a zero-flow angle. At 316, air flows into both the intake port 324 and the exhaust port 328. Accordingly, the overlap range corresponds to a range from 304 to 312.

Air flow into and out of the cylinder 320 from 300 to 316 corresponds to changes in the exhaust gas trapped within the cylinder 320. The RPC at EVC calculation module 216 applies the in-cylinder pressure model to determine the changes in the trapped exhaust gas. The RPC at EVC calculation module 216 then determines two base residual quantities, which include a potential residual that can be trapped in a cylinder clearance space (i.e., at TDC) and a potential residual that can be trapped in a cylinder swept space between IVO and TDC. The cylinder clearance space is, for example, related to a known volume of the cylinder. The cylinder swept space corresponds to a difference between the cylinder space at TDC and a cylinder space at an intake valve opening position. The RPC at EVC calculation module 216 determines the amount of residual (trapped exhaust gas) in the cylinder at the EVC position by summing the changes in the trapped exhaust residual as calculated using the in-cylinder pressure model with the calculated base residual quantities.

The RPC at EVC calculation module 216 determines the changes in the trapped exhaust gas in the exhaust backflow process by calculating the changes in the trapped exhaust gas over three states. The zero-flow angles θEBS and θIFS separate the exhaust backflow process described in FIG. 3 into the three states. A first state corresponds to intake valve open (IVO) to EBS (e.g., as shown in 300, a state prior to zero-flow angle θEBS). A second state corresponds to EBS to IFS (e.g., as shown in 304, 308, and 312, from zero-flow angle θEBS to zero-flow angle θIFS). A third state corresponds to IFS to EVC (e.g., as shown at 316, a state subsequent to zero-flow angle θIFS). The RPC at EVC calculation module 216 applies the in-cylinder pressure model in each of the three states to calculate the changes in the trapped exhaust gas.

The in-cylinder temperature calculation module 220 determines the in-cylinder temperature at BDC based in part on the amount of residual (trapped exhaust gas) calculated by the RPC at EVC calculation module 216, as well as other values including, but not limited to, Intake manifold pressure, intake manifold temperature, and/or exhaust manifold temperature. For example, the in-cylinder temperature calculation module 220 implements an in-cylinder temperature model based on the principle of energy conversion. The calculation of the in-cylinder temperature may assume a homogenous mixing of residual (trapped exhaust gas) and fresh air at BDC. The in-cylinder temperature model implemented by the module 220 may be represented as $$T_c = \frac{P_c(V_d + V_c)}{P_c(V_d + V_c) - R(T_e - T_i)n_e - \frac{2}{3}Q} T_i. \quad \text{(Equation 1)}$$

The APC at BDC calculation module 208 determines the APC at BDC based in part on the in-cylinder temperature as calculated by the in-cylinder temperature calculation module 220. In particular, the APC at BDC calculation module 208 applies the in-cylinder pressure model (which includes the calculated in-cylinder temperature) to determine a total charging content of the cylinder 320, and determines the APC at BDC by subtracting the trapped exhaust gas (as calculated by the RPC at EVC calculation module 216) from the total charging content. The determination of the total charging content $m_{total}$ can be represented as $$m_{total} = \frac{p_c V_{bdc}}{R_{mix} T_c}, \quad \text{(Equation 2)}$$

where $p_c$ is the in-cylinder pressure as determined using the in-cylinder pressure model, $V_{bdc}$ is the volume of the cylinder at BDC, and $T_c$ is the in-cylinder temperature as determined using the in-cylinder temperature model.

The RMF at BDC calculation module 212 determines the total RMF of exhaust gas trapped in the cylinder at BDC based on the total trapped exhaust gas (as calculated by the RPC at EVC calculation module 216) and the total charging content as calculated by the APC at BDC calculation module 208. For example, the total RMF of the exhaust gas trapped in the cylinder at BDC corresponds to a ratio of the total trapped exhaust gas to the total charging content.

The APC at IVC calculation module 204 determines a charging content backflow quantity using the in-cylinder pressure model. For example, the APC at IVC calculation module 208 applies the in-cylinder pressure model using the total trapped exhaust gas, a calculated amount of fresh air in the cylinder 320, and charging content backflow. The APC at IVC calculation module 204 determines the APC at the IVC position by subtracting the charging content backflow quantity from the APC at BDC (as calculated by APC at BDC calculation module 208). For example, the APC at IVC ($APC_{trapped}$) can be calculated according to $APC_{trapped} = (m_{total} - m_0)(1 - RMF)$ (Equation 3), where $m_0$ is the charging content backflow.

The in-cylinder pressure model $p_c$ implemented in various modules as described above can be represented as the following (Equation 4):

$$\left\{ \frac{1}{4}\pi B^2 \frac{1}{RT_c} \left[ r \cdot (1 - \cos(\omega t)) + l - \sqrt{l^2 - r^2 \sin^2(\omega t)} \right] + \frac{V_d}{(r_{cr} - 1)} \frac{1}{RT_c} \right\} p'_c +$$

$$\frac{1}{4}\pi B^2 r\omega \frac{1}{RT_c} \sin(\omega t) \left( 1 + \frac{r\cos(\omega t)}{\sqrt{l^2 - r^2\sin^2(\omega t)}} \right) p_c = \text{sgn}(p_e - p_c) b$$

$$\sqrt{1-\left(\frac{\frac{\min(p_e, p_c)}{\max(p_e, p_c)}-h}{1-h}\right)^2}\left(\sqrt{\frac{1}{RT_{e,c}}}\right)C_{ec,ed}A_e\max(p_e, p_c)+$$

$$\operatorname{sgn}(p_i - p_c)b\sqrt{1-\left(\frac{\frac{\min(p_i, p_c)}{\max(p_i, p_c)}-h}{1-h}\right)^2}\left(\sqrt{\frac{1}{RT_{i,c}}}\right)C_{ic,id}A_i\max(p_i, p_c)$$

In Equation 4, B is a cylinder bore diameter, $\omega$ is a crankshaft rotational speed, l is the length of connecting rod, r is the length of crank radius, $V_d$ is the swept volume of cylinder, $r_{cr}$ is the compression ratio of cylinder, $p'_c$ is the derivative of in-cylinder pressure, sgn( ) is the signum function, $p_e$ is exhaust port pressure, $p_i$ is intake port pressure, h is Choked Flow Psi (=0.5282817877), $T_{e,c}$ is the temperature of exhaust gas, $A_e$ is the effective exhaust valve opening area, $C_{ec,ed}$ is the exhaust valve flow coefficient, b is Critical Pressure Ratio (=0.6847314564), $C_{ic,id}$ is the intake valve flow coefficient, and $A_i$ is the effective intake valve opening area. Equation 4 can be used directly to solve for in-cylinder pressure for any given crank angle, or simplified as an $n^{th}$ order polynomial in the discrete domain when $A_e$, $A_i$, $\sin(\omega t)$, and $\cos(\omega t)$ are approximated using the $n^{th}$ order polynomial (e.g., $4^{th}$) and used to solve for crank angle for any combination of $p_e$, $p_c$, and $p_i$ (exhaust port pressure, in-cylinder pressure, and intake port pressure, respectively). The in-cylinder pressure model is based in part on the following approximation (Equation 5):

$$\sqrt{\frac{2\gamma}{\gamma-1}\left\{(x)^{\frac{2}{\gamma}}-(x)^{\frac{\gamma+1}{\gamma}}\right\}} = b\sqrt{1-\left(\frac{x-h}{1-h}\right)^2}$$

For 0.52828<x<1.0000 (where x corresponds to pressure ratio), the coefficient of determination ($R^2$) of the approximation (Equation 5) reaches 0.999998.

In Equation 5, $\gamma$=1.4 (the specific heat ratio of air), b is Critical Pressure Ratio (=0.6847314564), and h is Choked Flow Psi (=0.5282817877). Using the approximation of Equation 5 simplifies the in-cylinder pressure model and it makes turning the in-cylinder pressure model into polynomial equation a reality once $A_e$, $A_i$, $\sin(\omega t)$, and $\cos(\omega t)$ are approximated using the $n^{th}$ order polynomial. Solving in-cylinder pressure through a polynomial equation can significantly improve its efficiency and reduce ECM throughput.

Figure 4:
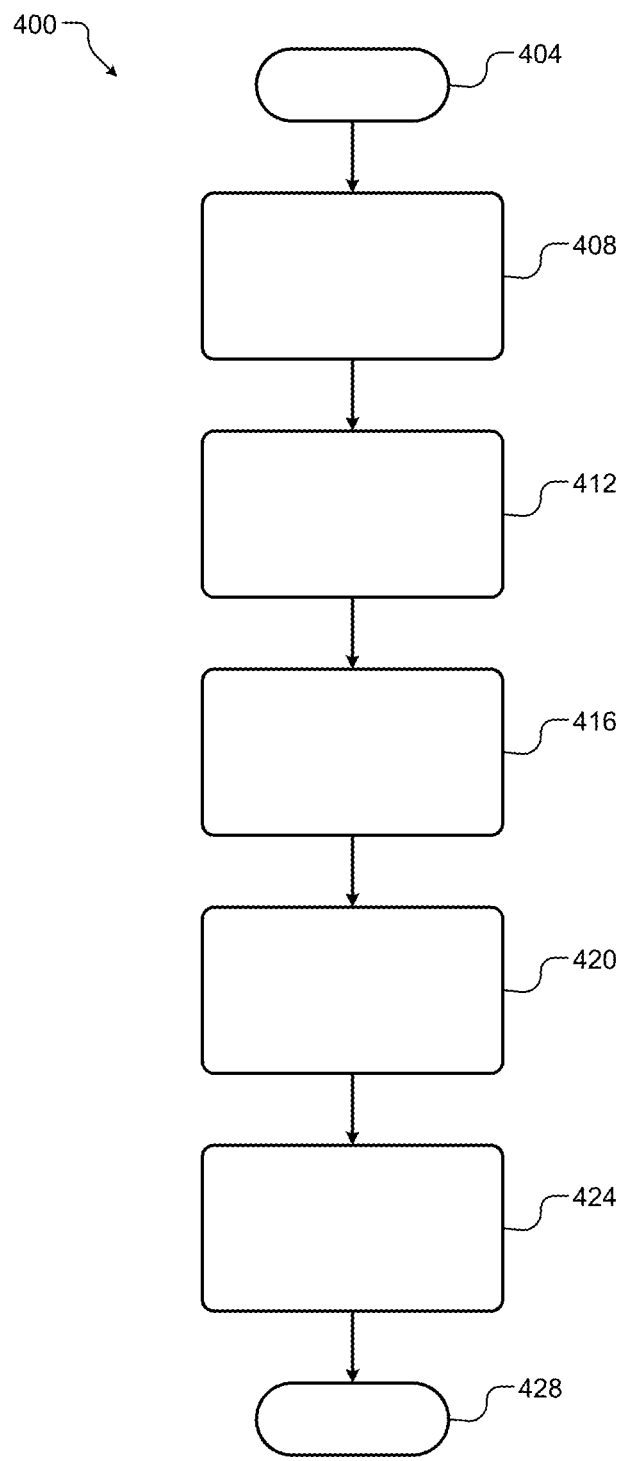
FIG. 4 illustrates an example method for calculating air per cylinder (APC) and residual per cylinder (RPC) according to the principles of the present disclosure.

Referring now to FIG. 4, an example method 400 for calculating RPC and APC according to the principles of the present disclosure begins at 404. At 408, the method 400 determines an amount of residual (trapped exhaust gas) at an EVC position. For example, the RPC at EVC calculation module 216 calculates the amount of residual (trapped exhaust gas) at EVC as described in FIG. 2. At 412, the method 400 determines an in-cylinder temperature at a BDC position. For example, the in-cylinder temperature calculation module 220 calculates the in-cylinder temperature as described in FIG. 2. At 416, the method 400 determines APC at BDC. For example, the APC at BDC calculation module 208 calculates the APC at BDC as described in FIG. 2. At 420, the method 400 determines the RMF at BDC. For example, the RMF at BDC calculation module 212 calculates the RMF at BDC as described in FIG. 2. At 424, the method 400 determines APC at the IVC position. For example, the APC at IVC calculation module 204 calculates the APC at IVC as described in FIG. 2. The method 400 ends at 428.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a residual per cylinder (RPC) calculation module that calculates changes in an amount of residual within an engine cylinder over a range of crank angles and calculates the amount of residual within the engine cylinder based on the calculated changes, wherein the residual corresponds to exhaust gas trapped within the engine cylinder, and wherein, to calculate the changes in the amount of residual, the RPC calculation module is configured to
calculate an overlap range in the range of crank angles, wherein the range of crank angles includes a first state prior to the overlap range, a second state corresponding to the overlap range, and a third state subsequent to the overlap range, and wherein, in the overlap range, an intake port of the engine cylinder is opening and an exhaust port of the engine cylinder is closing, and
calculate, based on the overlap range, a respective change in the residual within the engine cylinder in each of the first state, the second state, and the third state;
an in-cylinder temperature calculation module that calculates a temperature within the engine cylinder based on the calculated amount of residual;
a first air per cylinder (APC) calculation module that (i) calculates a total charge content within the engine cylinder at a predetermined crank angle based on the calculated temperature and (ii) calculates a first amount of air trapped within the engine cylinder based on the total charge content and the calculated amount of residual gas;
a residual mass fraction (RMF) calculation module that calculates an RMF of the exhaust gas trapped within the engine cylinder based on the total charge content;
a second APC calculation module that (i) determines a backflow into the engine cylinder and (ii) calculates a second amount of air trapped within the engine cylinder based on the backflow and the first amount of air; and
an engine control module that controls combustion performance an engine based on at least one of the RMF and the second amount of air, wherein controlling the combustion performance includes at least one of maximizing a volumetric efficiency of the engine, controlling the amount of residual within the engine cylinder, and controlling the first amount of air trapped within the engine cylinder.

2. The system of claim 1, wherein the RPC calculation module calculates the amount of residual at an exhaust valve closed (EVC) position of the engine cylinder.

3. The system of claim 1, wherein the RPC calculation module calculates the amount of residual based on zero-flow angles associated with the engine cylinder.

4. The system of claim 1, wherein the first APC calculation module calculates the first amount of air based on a difference between the total charge content and the calculated amount of residual.

5. The system of claim 1, wherein the second residual calculation module calculates the RMF of the exhaust gas at a bottom dead center (BDC) position of the engine cylinder.

6. The system of claim 1, wherein the second APC calculation module calculates the second amount of air at an intake valve closed position of the engine cylinder.

7. The system of claim 1, wherein the second APC calculation module calculates the second amount of air based on a difference between the backflow and the first amount of air.

8. A method comprising:
calculating changes in an amount of residual within an engine cylinder over a range of crank angles and calculating the amount of residual within the engine cylinder based on the calculated changes, wherein the residual corresponds to exhaust gas trapped within the engine cylinder, and wherein calculating the changes in the amount of residual includes
calculating an overlap range in the range of crank angles, wherein the range of crank angles includes a first state prior to the overlap range, a second state corresponding to the overlap range, and a third state subsequent to the overlap range, and wherein, in the overlap range, an intake port of the engine cylinder is opening and an exhaust port of the engine cylinder is closing, and
calculating, based on the overlap range, a respective change in the residual within the engine cylinder in each of the first state, the second state, and the third state;
calculating a temperature within the engine cylinder based on the calculated amount of residual;
calculating a total charge content within the engine cylinder at a predetermined crank angle based on the calculated temperature;
calculating a first amount of air trapped within the engine cylinder based on the total charge content and the calculated amount of residual gas;
calculating a residual mass fraction (RMF) of the exhaust gas trapped within the engine cylinder based on the total charge content;
determining a backflow into the engine cylinder;
calculating a second amount of air trapped within the engine cylinder based on the backflow and the first amount of air; and
controlling combustion performance of an engine based on at least one of the RMF and the second amount of air, wherein controlling the combustion performance includes at least one of maximizing a volumetric efficiency of the engine, controlling the amount of residual within the engine cylinder, and controlling the first amount of air trapped within the engine cylinder.

9. The method of claim 8, wherein calculating the amount of residual includes calculating the amount of residual at an exhaust valve closed (EVC) position of the engine cylinder.

10. The method of claim 8, wherein calculating the amount of residual includes calculating the amount of residual based on zero-flow angles associated with the engine cylinder.

11. The method of claim 8, wherein calculating the first amount of air includes calculating the first amount of air based on a difference between the total charge content and the calculated amount of residual.

12. The method of claim 8, wherein calculating the RMF of the exhaust gas includes calculating the RMF of the exhaust gas at a bottom dead center (BDC) position of the engine cylinder.

13. The method of claim 8, wherein calculating the second amount of air includes calculating the second amount of air at an intake valve closed position of the engine cylinder.

14. The method of claim 8, wherein calculating the second amount of air includes calculating the second amount of air based on a difference between the backflow and the first amount of air.

* * * * *